Aug. 3, 1943.   C. L. MORRIS   2,325,969
ROD JOINT CUTTING TOOL
Filed April 13, 1942   2 Sheets-Sheet 1
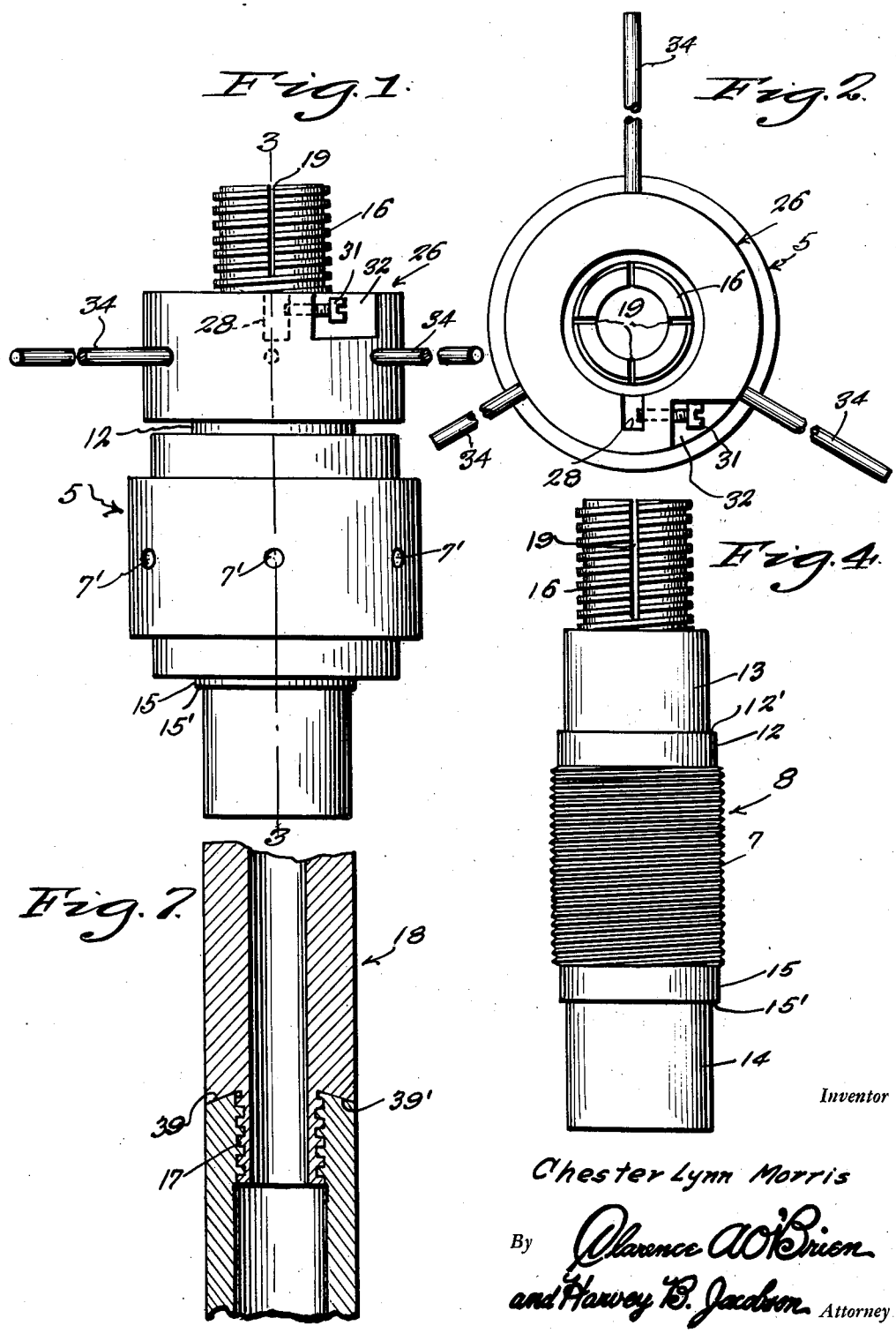
Inventor
Chester Lynn Morris Aug. 3, 1943.  C. L. MORRIS  2,325,969
ROD JOINT CUTTING TOOL
Filed April 13, 1942   2 Sheets-Sheet 2
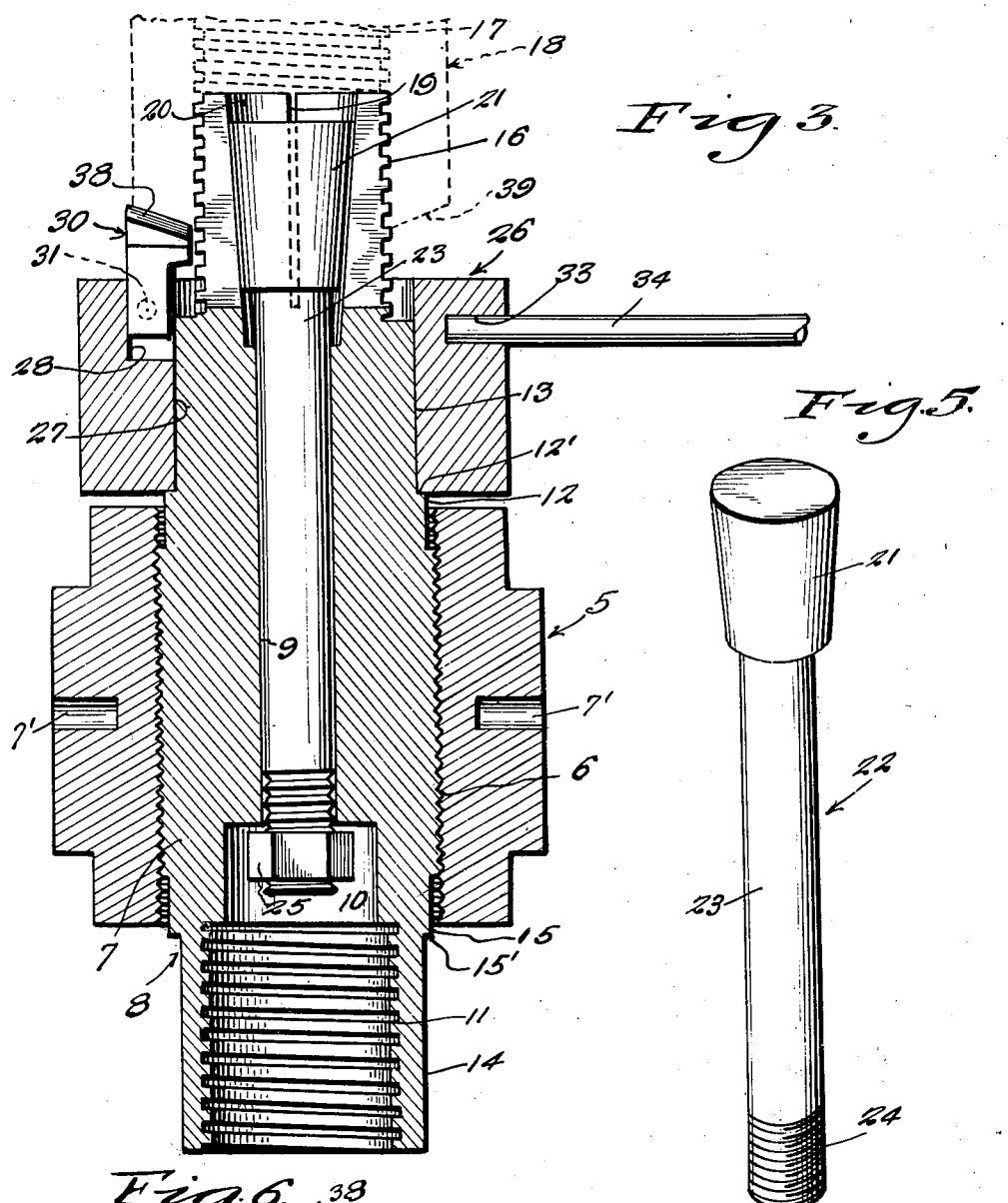

Patented Aug. 3, 1943

2,325,969

UNITED STATES PATENT OFFICE 2,325,969

ROD JOINT CUTTING TOOL

Chester Lynn Morris, Falls City, Nebr.

Application April 13, 1942, Serial No. 438,850

2 Claims. (Cl. 82—4)

The invention relates generally to improvements in rod and pipe cutting means, and more particularly to a cutter for forming new joints on oil well rods, and the primary object of the invention is to provide a simple and efficient arrangement of this character enabling quickly, easily, and accurately cutting new joints particularly on oil well rods in field work.

Other important objects and advantages of the invention will be apparent from a reading of the following description taken in connection with the appended drawings, wherein for purposes of illustration a preferred embodiment of the invention is shown.

In the drawings:

Figure 1 is a general side elevational view showing the device adjusted and arranged to make a cut on the box end of a rod.

Figure 2 is a top plan view of Figure 1.

Figure 3 is an enlarged transverse vertical sectional view taken through Figure 1 along the line 3—3 and showing the upper part of the tool applied to the box end of the rod.

Figure 4 is a side elevational view of the pilot.

Figure 5 is a perspective view of the expander.

Figure 6 is a group perspective view of a pair of oppositely angulated cutters.

Figure 7 is a fragmentary transverse vertical sectional view taken through a rod joint, indicating a form of joint cut by the device of the invention.

Referring in detail to the drawings, the numeral 5 generally designates the nut which has a fine internal thread 6 for a slow feed and threaded on the intermediate portion 7 of the pilot which is generally designated 8. Diametrical holes 7' in the nut 5 provide for utilizing bars or rods to hold the nut or to turn the same to feed the pilot 8 longitudinally in the nut in the desired direction, in accordance with the operation being performed.

The pilot 8 whose maximum diameter is at the threaded portion 7 has an axial bore 9 which terminates at its lower end in a reduced diameter chamber 10 which terminates in a larger diameter square threaded portion 11 which opens through the bottom of the pilot as indicated in Figure 3 of the drawings. Above the exteriorly threaded portion 7 is a somewhat diametrically reduced portion 12 which terminates to define the shoulder 12' adjacent the further diametrically reduced smooth exterior journal portion 13 which corresponds in diameter with the smooth exterior journal portion 14 on the lower end of the pilot. The journal portions are provided to rotatably receive the tool carrier to be described. Like the upper portion of the pilot the lower journal portion has a shoulder 15' which is defined with the journal portion 14 by a larger diameter portion 15 which is itself smaller in diameter than the externally threaded portion 7.

Projecting upwardly from the journal portion 13 is an exteriorly threaded portion 16 which is provided with a square thread to mate with the square internal thread 17 on the box end of the rod 18. At circumferentially spaced intervals the threaded terminal 16 has longitudinal slots 19 and the portion 16 is interiorly tapered as indicated by the numeral 20 so that the tapered head 21 on the upper end of the expander 22 can expand the portion 16 into the box end of the rod and thereby prevent rotation of the rod relative to the cutter while the tool carrier is being rotated to effect the cutting. The reduced unit small diameter portion 23 of the expander turns relatively closely in the bore 9 in the pilot and has a threaded lower end 24 to receive the nut 25 by which the expander is drawn downwardly to expand the slotted portion 16.

The tool carrier which is generally designated 26 comprises a heavy annulus formed with a smooth axial bore 27 to turn closely on the journal portions 13 and 14. The axially outward end of the carrier is provided with a radial notch 28 in which the proper one of the tools 29 or 30 is operatively seated. A locking set screw 31 enters the notch 28 to lock the tool in place as indicated in Figure 2 of the drawings, the head of the screw being located in a recess 32 in the periphery of the carrier. The carrier is provided at intervals with radial openings 33 to act as sockets for the turning rods or bars 34.

Referring to Figure 6 of the drawings the cutter 30 comprises the vertical shank 35, the laterally projecting portion 36, and the upset portion 37 along one side of the portion 36, provided with the cutting surface 38, the shank 35 being adapted to be seated in the notch 28 as indicated in Figure 3 of the drawings to present the cutting edge 38 at a downward and inward slant to cut the joint surface 39 on the box end of the rod 18.

The cutter 29 comprises a similar shank 35' surmounted by an obtusely angulated lateral projection 36' which has an upset portion 37' along one edge terminating at its upper end in the cutting edge 38' angulated oppositely to the cutting edge 38, for cutting the oppositely angulated joint surface on the coupling end of the rod as indicated by the numeral 39' in Figure 7 of the drawings.

Although I have shown and described herein a preferred embodiment of the invention, it is to be definitely understood that I do not wish to limit the application of the invention thereto, except as may be required by the scope of the subjoined claims.

Having described the invention, what is claimed as new is:

1. A cutting tool of the character described comprising a pilot consisting of a substantially cylindrical elongated body provided intermediate its ends with a feed thread, a feeding nut threaded on said feed thread, opposite ends of said pilot beyond said feed thread being formed as tool carrier journals, an annular tool carrier adapted for operative mounting on either journal, a cutter mounted on the carrier and having a radially inwardly projecting cutting edge for engagement with the work, and means for turning the carrier relative to the pilot, one of said journal portions having an axial extension externally threaded to thread into the box end of a rod joint, said extension being longitudinally split and axially aligned with a bore formed in said pilot, and a tapered expanding head for expanding the split portion.

2. A cutting tool of the character described comprising a pilot consisting of a substantially cylindrical elongated body provided intermediate its ends with a feed thread, a feeding nut threaded on said feed thread, opposite ends of said pilot beyond said feed thread being formed as tool carrier journals, an annular tool carrier adapted for operative mounting on either journal, a cutter mounted on the carrier and having a radially inwardly projecting cutting edge for engagement with the work, and means for turning the carrier relative to the pilot, one of said journal portions having an internally threaded tubular portion for threading on the coupling end of a rod while said carrier is operatively mounted on the corresponding journal portion.

CHESTER LYNN MORRIS.